United States Patent
Alfieri et al.

(10) Patent No.: US 7,039,720 B2
(45) Date of Patent: May 2, 2006

(54) DENSE VIRTUAL ROUTER PACKET SWITCHING

(75) Inventors: Stephen M. Alfieri, Scarborough, ME (US); Chase T. Tingley, Somerville, MA (US)

(73) Assignee: Marconi Intellectual Property (Ringfence) , Inc., Warrendale, PA (US)

( * ) Notice: Subject to any disclaimer, the term of this patent is extended or adjusted under 35 U.S.C. 154(b) by 611 days.

(21) Appl. No.: 10/000,191

(22) Filed: Oct. 19, 2001

(65) Prior Publication Data

US 2002/0099849 A1 Jul. 25, 2002

Related U.S. Application Data

(60) Provisional application No. 60/264,093, filed on Jan. 25, 2001.

(51) Int. Cl.
   G06F 15/173 (2006.01)
   H04L 12/28 (2006.01)
   H04L 12/56 (2006.01)

(52) U.S. Cl. .................. 709/242; 709/242; 709/239; 709/238; 709/240; 370/395.31; 370/401; 370/409

(58) Field of Classification Search .......... 709/238, 709/239, 240, 241, 242, 230; 370/395.31, 370/351, 355, 356, 401, 409
   See application file for complete search history.

(56) References Cited

U.S. PATENT DOCUMENTS

| | | | |
|---|---|---|---|
| 6,205,488 B1 * | 3/2001 | Casey et al. | 709/238 |
| 6,493,349 B1 * | 12/2002 | Casey | 370/409 |
| 6,594,704 B1 * | 7/2003 | Birenback et al. | 709/238 |
| 6,614,781 B1 * | 9/2003 | Elliott et al. | 370/352 |
| 6,674,756 B1 * | 1/2004 | Rao et al. | 370/395.21 |
| 6,693,878 B1 * | 2/2004 | Daruwalla et al. | 370/235 |
| 6,744,774 B1 * | 6/2004 | Sharma | 370/401 |
| 6,778,498 B1 * | 8/2004 | McDysan | 370/231 |

(Continued)

OTHER PUBLICATIONS

Mitul Tiwari, "IP Based Virtual Private Network—B. Tech. Project Report", Department of Computer Science and Engineering, Indian Institute of Technology, Mumbai, www.c-se.iitb.ernet.in:8000/proxy/everest/~mits/report/report.html (Nov. 2000).

(Continued)

*Primary Examiner*—Ario Etienne
*Assistant Examiner*—El Hadji M. Sall
(74) *Attorney, Agent, or Firm*—Ansel M. Schwartz

(57) ABSTRACT

A dense virtual router packet switching system includes a memory divided into context areas for a set of virtual private routed networks (VPRNs). Each context area includes a routing table and routing protocol state information for a corresponding VPRN. Each of a set of different routing tasks operates with a separate routing table and separate routing protocol state information to realize a corresponding virtual router. Context selection logic selectively couples the routing tasks to the different context areas of the memory to realize a set of virtual routers for all the VPRNs. The system supports a large number of routes by exploiting the segmentation of the VPRNs. Rather than having a single large routing table and associated routing process, which can load hardware resources in proportion to the square of the number of routes in the routing table, routes are distributed among a number of VPRNs having generally smaller tables and correspondingly less processing demand.

10 Claims, 5 Drawing Sheets

U.S. PATENT DOCUMENTS

| | | | |
|---|---|---|---|
| 6,789,118 B1 * | 9/2004 | Rao | 709/225 |
| 6,850,531 B1 * | 2/2005 | Rao et al. | 370/401 |
| 6,920,134 B1 * | 7/2005 | Hameleers et al. | 370/389 |
| 6,954,463 B1 * | 10/2005 | Ma et al. | 370/401 |

OTHER PUBLICATIONS

International Engineering Consortium, Online Education, "MPLS and Its Components", http://www.iec.org/online/tutorials/mpls/topic03.html, (2001).

International Engineering Consortium, Online Education, "MPLS Operation", http://www.iec.org/online/tutorials/mpls/topic04.html, (2001).

International Engineering Consortium, Online Education, "MPLS Protocol Stack Architecture" http://www.iec.org/online/tutorials/mpls/topic05.html, (2001).

Cisco Systems Inc., "Resource Reservation Protocol (RSVP)" http://www.cisco.com/univercd/cc/td/doc/cisintwk/ito_doc/rsvp.htm (1989-1999).

* cited by examiner

DENSE VIRTUAL ROUTER PACKET SWITCHING

CROSS REFERENCE TO RELATED APPLICATIONS

This application claims priority under 35 U.S.C. §119(e) of U.S. Provisional Patent Application No. 60/264,093 filed Jan. 25, 2001.

STATEMENT REGARDING FEDERALLY SPONSORED RESEARCH OR DEVELOPMENT

Not Applicable

BACKGROUND OF THE INVENTION

The present invention is related to the field of routed networks, and more particularly to routed networks employing virtual private routed network (VPRN) techniques.

One of the challenges facing designers of data communications networks is to provide improved performance in the face of tremendous growth in network size and complexity. As the number of nodes using distinct network addresses in a network grows, the sizes of routing tables used for routing in the network increase, and more processing power is required to calculate routes and carry out the routing of network traffic. In fact, the processing load associated with routing increases generally as the square of the number of distinct routes. In large networks having a generally flat shared address space, such as the Internet, it may be infeasible for routers to support sufficiently large routing tables, due to constraints in the available processing power.

It has been known to emulate a private, wide-area routed network within another, generally more public, wide-area network. Such an emulated network is referred to as a virtual private routed network (VPRN). Because a VPRN "piggybacks" on a separate and generally shared network, it can be more cost effective than a distinct private wide area network. At the same time, there is significant functional separation between the VPRN and the underlying network, so that VPRN largely behaves like a standalone network, with attendant benefits in security, network management, and other aspects of network operation.

In a common VPRN configuration, the VPRN employs Internet Protocol (IP) technology of the same type used in the Internet, complete with a private instance of a distributed IP routing protocol such as Open Shortest Path First (OSPF) and a private set of network addresses such as IPv4 addresses. A mesh of "tunnels", or dedicated virtual channels, are established among a set of router nodes in the Internet. The router nodes encapsulate VPRN traffic in a format required by the tunnels, transmit encapsulated traffic to other router nodes using the Internet address space and routing protocols, decapsulate received traffic to recover the original VPRN traffic, and then use the VPRN routing protocols and address space to forward the traffic to other nodes in the VPRN outside the Internet.

BRIEF SUMMARY OF THE INVENTION

In accordance with the present invention, a dense virtual router packet switching system is disclosed that achieves improved performance even in very large networks with a large number of routes.

The disclosed system includes a memory divided into a number of context areas for a set of virtual private routed networks (VPRNs), where each VPRN employs a respective routing protocol and network address space. Multiple instances of the same routing protocol may be in use by different VPRNs, and different VPRNs may also use overlapping network addresses. Each context area of the memory includes a routing table and routing protocol state information for a corresponding VPRN.

The system further includes a set of routing tasks, including at least one routing task for each different type of routing protocol employed in the set of VPRNs. Each routing task operates with a separate routing table and separate routing protocol state information to realize a "virtual router" to carry out routing operations. Context selection logic selectively couples the routing tasks to the different context areas of the memory, thereby realizing a set of virtual routers for all the VPRNs supported by the dense virtual routing system.

For a given total number of routes, the use of VPRNs can improve performance over a non-segmented network by reducing the processing load for each VPRN by an amount that more than compensates for replicating the processing for each VPRN. For example, if one million routes are supported in a non-segmented network, the processing load is on the order of the square of 1 million, or $10^{12}$, processing operations per unit time. If the same one million routes are segmented into 1000 VPRNs of 1000 routes apiece, then the processing load is on the order of $1000 \times (1000)^2$, or $10^9$, processing operations per unit time.

Other aspects, features, and advantages of the present invention are disclosed in the detailed description that follows.

BRIEF DESCRIPTION OF THE SEVERAL VIEWS OF THE DRAWING

The invention will be more fully understood by reference to the following Detailed Description in conjunction with the Drawing, of which.

DETAILED DESCRIPTION OF THE INVENTION

The disclosure of U.S. Provisional Patent Application No. 60/264,093 filed Jan. 25, 2001, is hereby incorporated by reference herein.

Figure 1:
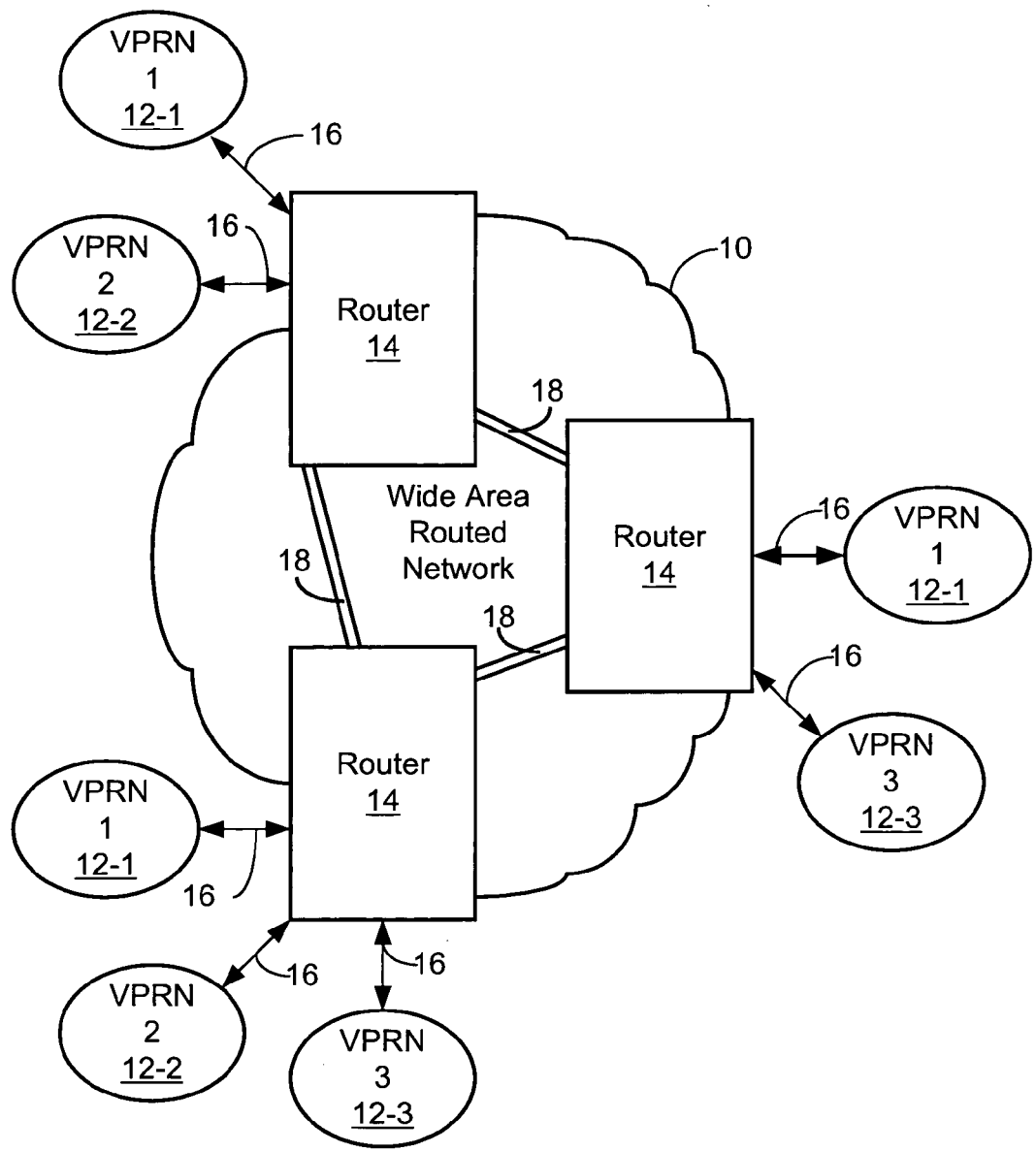
FIG. 1 is a block diagram of a network including routers employing dense virtual router packet switching in accordance with the present invention.

FIG. 1 shows a network in which a wide-area routed network 10 is utilized to carry traffic for a number of virtual private routed networks (VPRNs). Each VPRN includes corresponding VPRN subnetworks 12. In FIG. 1, VPRNs numbered 1 through 3 are shown, with each including corresponding subnetworks 12-1, 12-2 and 12-3. The wide-area routed network 10 includes a number of routers 14. Each router 14 has connections to access links 16 that connect the router 14 to local VPRN subnetworks 12, and has connections to backbone links 18 that connect the router 14 to other routers 14 in the wide-area routed network 10.

An example of the wide-area routed network 10 is a global network such as the Internet. In general, the wide-area routed network 10 has a given network address space and a defined set of communications protocols, including routing protocols. For example, the wide-area routed network 10 may employ the Internet Protocol (IP) with IP version 4 (IPv4) addressing, and employ routing protocols such as Border Gateway Protocol (BGP), Open Shortest Path First (OSPF), Routing Information Protocol (RIP), etc.

Each VPRN, which is made up of a corresponding set of VPRN subnetworks 12, is a routed network having its own network address space and network communications protocols, including a routing protocol. Nodes within a VPRN are generally not assigned addresses in the address space of the wide-area routed network 10, nor do the routers 14 carry traffic on their specific behalf. Rather, as described in more detail below, the routers 14 utilize the address space and routing protocols of the wide-area routed network 10 on behalf of the VPRN subnetworks 12 as entities. The VPRN subnetworks 12, in turn, utilize their respective private address spaces and routing protocols for internal routing of data traffic among specific computers or other types of network sources and destinations. Fundamentally, the wide-area routed network 10 and routers 14 serve to provide dedicated virtual connections among the VPRN subnetworks 12 to form the various larger-scale VPRNs.

Figure 2:
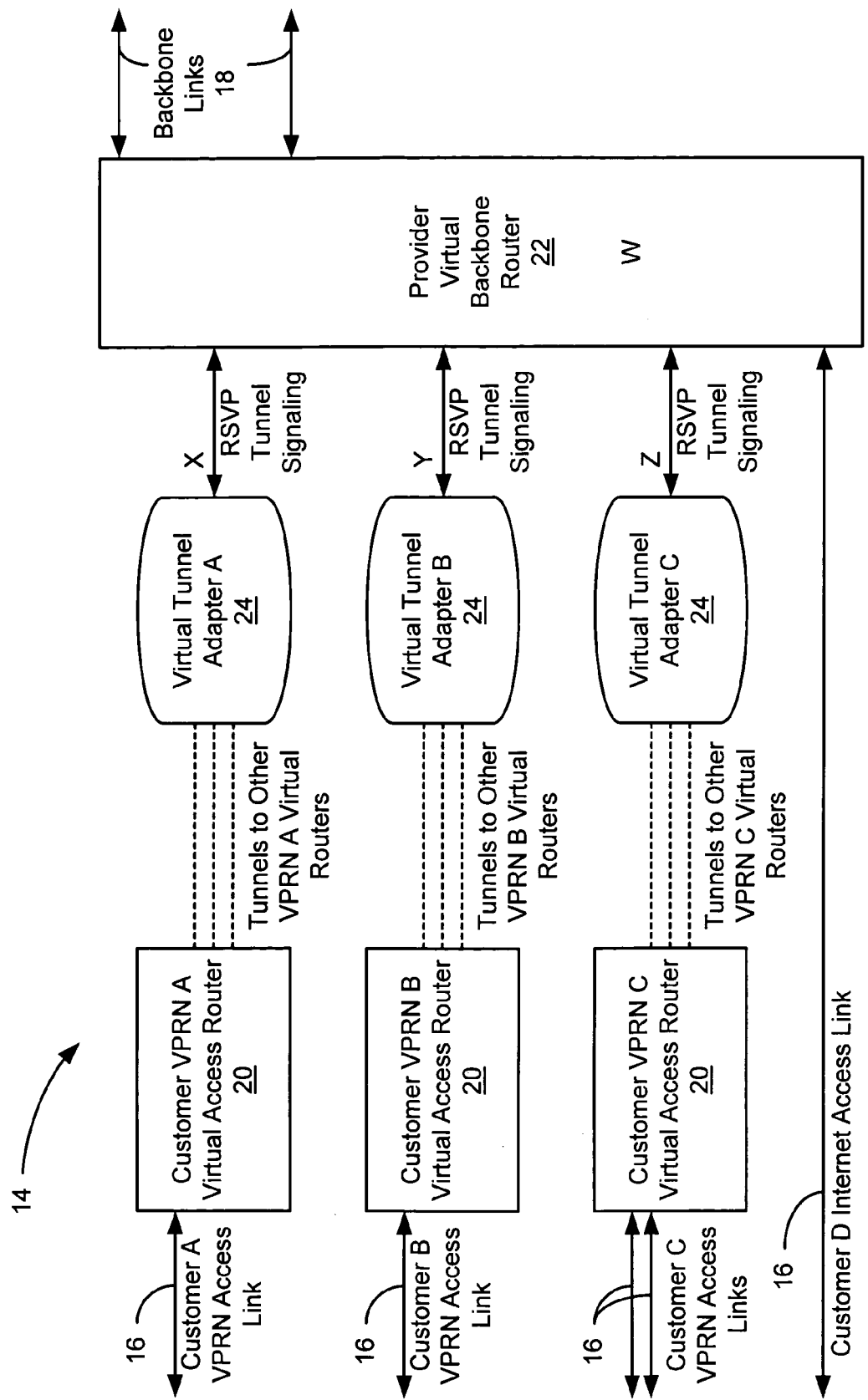
FIG. 2 is a high-level functional block diagram of a router in the network of FIG. 1.

FIG. 2 shows an exemplary organization of a router 14.

Several "virtual access routers" (VARs) 20 are associated with respective customers and connected to the respective customers'access links 16. These are described in more detail below. A provider "virtual backbone router" (VBR) 22 is connected to the backbone links 18 of the wide area routed network 10 of FIG. 1. The VBR 22 uses IP addresses from the address space of the wide area routed network 10, which is separate from the address spaces of the VPRNs. The VBR 22 provides a tunneling service to VARs 20 that is used in constructing the VPRNs. A signaling protocol such as the Resource Reservation Protocol (RSVP) is used to set up the tunnels. The VBR 22 may also provide direct access to the wide area routed network 10 for customers desiring such service, such as Customer D in FIG. 2. The VBR 22 participates in the full routing for the wide-area routed network 10. In the case of the Internet, the VBR 22 generally maintains a full BGP routing table.

Each VAR 20 has its own routing table and runs its own instances of the routing protocols used in the corresponding VPRN. The network addresses (e.g., IP addresses) of a VAR 20 are taken from the address space of the VPRN to which the VAR belongs. Different VARs 20 can use overlapping sets of addresses, i.e., the same address may appear in different sets, even though the different instances of the address belong to different nodes in different VPRNs. There is generally no direct connection, in the sense of an IP routing adjacency, between different VARs 20 within a router 14 or between a VAR 20 and the VBR 22.

As mentioned, RSVP signaling is used to create tunnels within the wide-area routed network 10 to connect VARs 20 residing in different routers 14. This signaling is accomplished through the use of virtual tunnel adapters (VTAs) 24. These devices resemble IP hosts residing in the wide-area routed network 10, and have host IP addresses in the address space of the wide-area routed network 10. Each VTA 24 has a signaling interface via which the VTA 24 is instructed to establish a tunnel connection between a local VAR 20 and a remote VAR 20 residing on another router 14 (not shown in FIG. 2).

Figure 3:
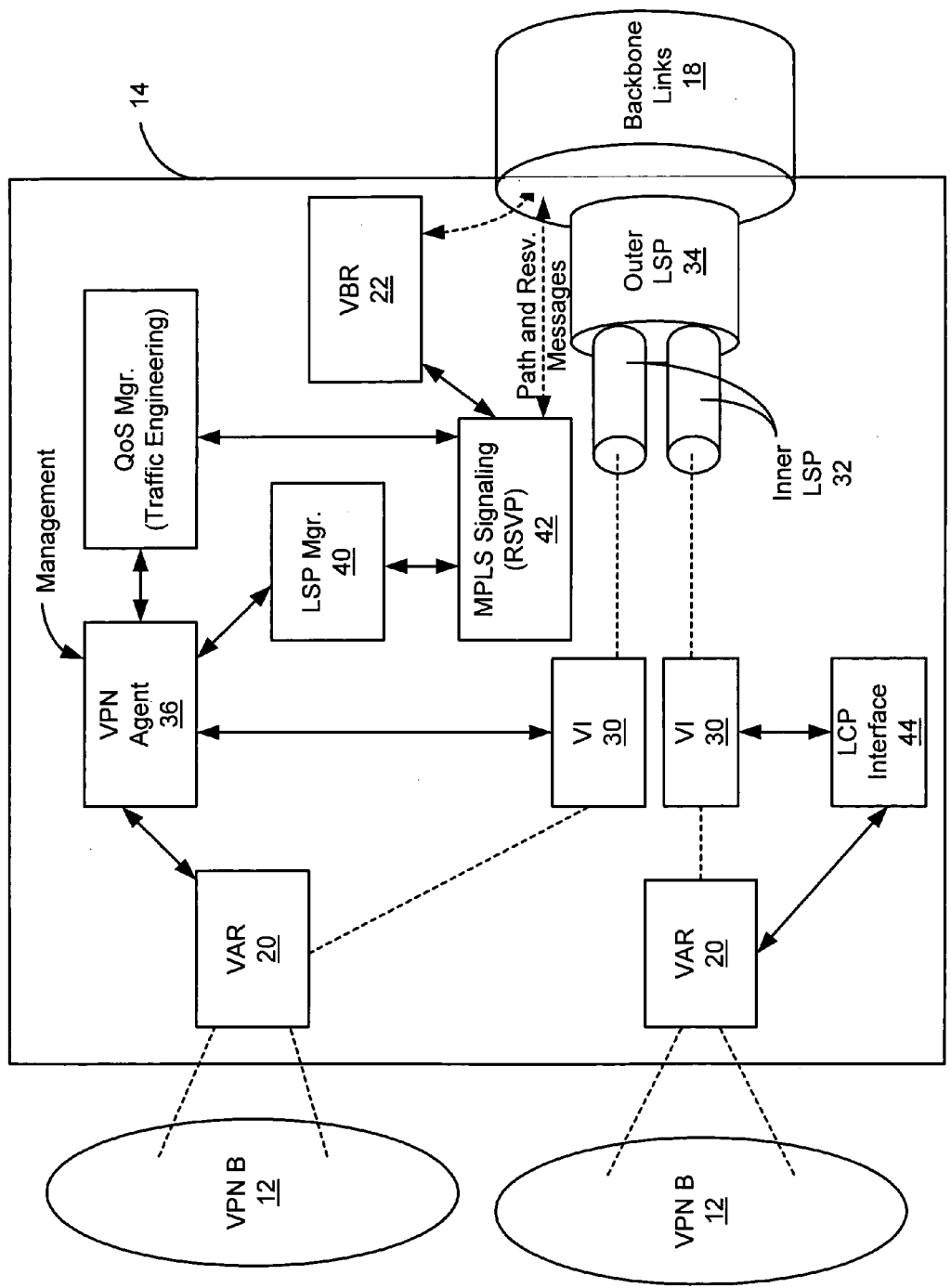
FIG. 3 is a more detailed functional block diagram of the router of FIG. 2.

FIG. 3 shows a more detailed view of a router 14. The VARs 20 are associated with Virtual Interfaces (VIs) 30, which in turn are associated with MPLS label switched paths (LSPs) on the backbone links 18 of the wide area routed network 10. LSPs are established to form the tunnels through the wide area routed network 10 that link the various VPRN subnetworks 12. As shown, a two-level hierarchy of LSPs is used. An "inner" LSP 32 carries traffic specifically associated with a given VI 30. An "outer" LSP 34 carries a group of inner LSPs 32. A different outer LSP 34 is defined between each pair of routers 14 in the wide-area routed network 10.

The router 14 also includes various additional functional entities such as a VPN Agent 36, Quality of Service (QoS) Manager 38, LSP Manager 40, MPLS Signaling function 42, and Line Control Processor (LCP) Interface 44. The VPN Agent 36 coordinates the configuration of the VPRNs. The VPN Agent 36 instatiates VARs 20 and VIs 30, interacts with the LSP Manager 40 to coordinate the use of labels, and passes QoS information to the LSP manager 40 for dynamically configured labels. The QoS Manager 38 handles the QoS aspect of the setting up of LSPs, which includes interpreting the QoS parameters of RSVP.

The LSP Manager 40 coordinates all aspects of LSPs, including the creation and deletion of LSPs and the maintenance of label information. It interfaces with the VPN agent 36 and the MPLS signaling function 42 in the creation, monitoring, and deletion of LSPs.

The MPLS signaling function 42 implements RSVP signaling for MPLS. At an ingress node for an LSP, the MPLS signaling function 42 signals downstream to obtain a label. At an egress node, the MPLS signaling function 42 passes labels upstream. At a transit node, the MPLS signaling function 42 interfaces with upstream and downstream routers to distribute labels.

The MPLS signaling function 42 also interfaces with routing code to obtain next hop information, and passes label information to the LSP Manager 40.

The LCP interface 44 passes forwarding information from the software-implemented functions of FIG. 3, such as the VARs 20 and VIs 30, to hardware forwarding engines residing on line cards (not shown) within the router 14. The forwarding information falls into four categories: next hop routing information, MPLS label information, packet classification information, and QoS information.

Figure 4:
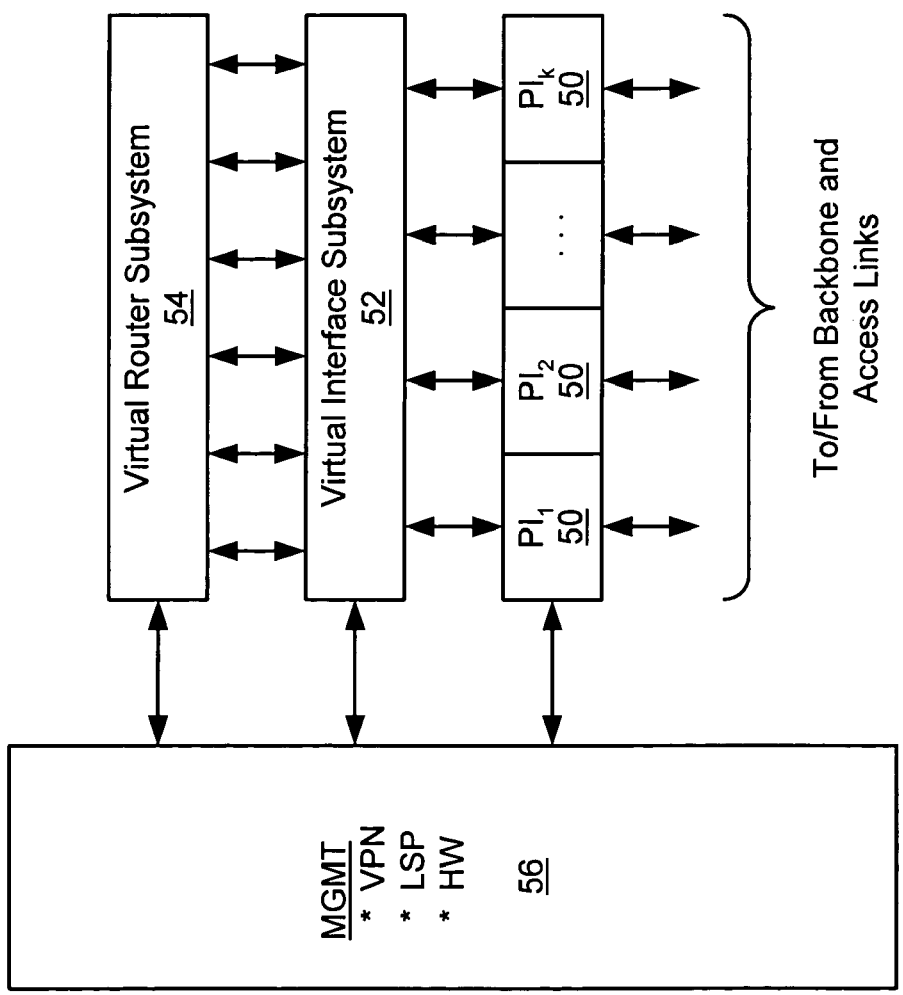
FIG. 4 is a high-level block diagram depicting the hardware/software architecture of the router of FIGS. 2 and 3.

FIG. 4 shows a high-level software and hardware organization for the routers 14. A number of physical interfaces (PIs) 50 connect to the access links 16 and backbone links 18 of FIGS. 1–3. Examples of such interfaces include Ethernet interfaces, SONET interfaces, etc. A layer-2 protocol such as ATM may also be used. Each PI 50 is also connected to a virtual interface (VI) subsystem 52, which includes all of the VIs in the router 14, such as the VIs 30 of FIG. 3. The VI subsystem 52 has a number of connections to a virtual router (VR) subsystem 54, which includes all the virtual routers such as the VARs 20 and VBR 22 of FIG. 3. The PIs 50, VI subsystem 52, and VR subsystem 54 are coupled to a collection of other functional elements labeled in FIG. 4 as a management subsystem 56. The management subsystem 56 includes the VPN agent 36, QoS Manager 38, LSP Manager 40, MPLS Signaling function 42 and LCP interface 44 of FIG. 3.

The, virtual routers (VRs) within the VR subsystem 54 generally consist of processes and associated data that behave as a number of separate, distinct routers. Each VR is associated with a different VPRN. A given router 14 may include a few or many such VRs in accordance with the number of VPRNs having traffic flowing through the router 14. Subject to hardware constraints of a given platform, such as processing power and memory capacity, a router 14 may be configured with as many as hundreds or potentially thousands of such VRs.

The VI subsystem 52 provides a special function within the router 14. A conventional router generally includes a routing subsystem tied directly to physical interfaces, without an intermediate subsystem such as the VI subsystem 52 shown in FIG. 4. Accordingly, changes to the underlying physical network result in the need to change routing tables and other data structures in the routing subsystem. Examples of such changes to the physical network include manual reconfigurations and automatic protection switching. When the routing subsystem has a very large routing data structure, as is the case for the VR subsystem 54, it is difficult and inefficient to maintain physical-layer information within it. The arrangement of FIG. 4 addresses these problems by "virtualizing" the interfaces from the perspective of the virtual routers in the VR subsystem 54. Each virtual router employs static, generic interface identifiers, and the VI subsystem 52 handles the translation between these interface identifiers and details of underlying physical interfaces, which in general are subject to dynamic change.

Figure 5:
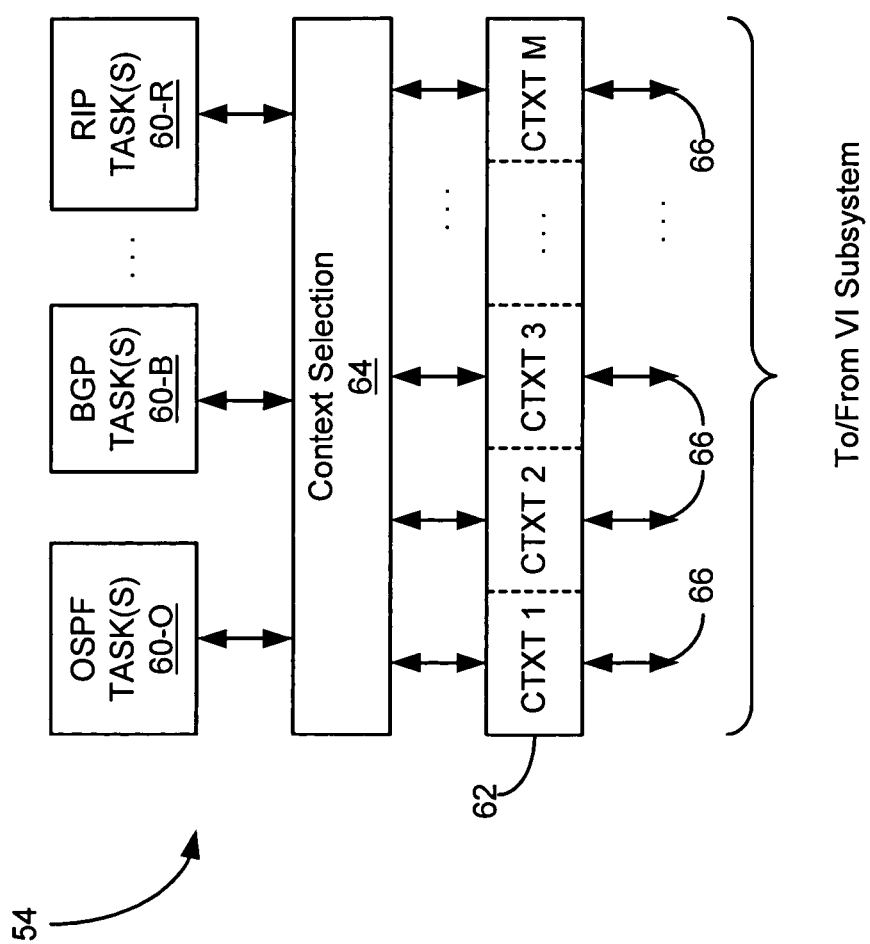
FIG. 5 is a block diagram of a virtual router subsystem in the router of FIGS. 2–4.

FIG. 5 shows the VR subsystem 54. A collection of routing processes or tasks such as OSPF tasks 60-O, BGP tasks 60-B, and RIP tasks 60-R are coupled to a memory 62 via context selection logic 64. The memory 62 is divided into a number of context areas, shown as CTXT 1, CTXT 2, . . . CTXT M, for M distinct VRs. Each context area contains a routing table and other operating state information for a different VR. The tasks 60 are independent processes that are time-shared among the various VRs. The time-sharing is accomplished in part via the context selection logic 64. As events occur that require action for a given VR (most such events being associated with the sending and receiving of routing protocol messages or packets), the context selection logic 64 couples the appropriate task 60 to the context area CTXT for that VR. The task 60 then executes using the data from that context area CTXT. This processing continues to completion before a subsequent event is permitted to activate another VR, at which time the same or a different task 60 becomes coupled to a context area CTXT for the other VR.

As an example, let it be assumed that a VR identified as VR #134 is part of a VPRN in which the OSPF routing protocol is used. Context area CTXT 134 of the memory 62 contains the routing table and other operating state for this VR. Upon receipt of a routing protocol packet on a VI associated with VR #134, an OSPF task 60-O is activated, and the context selection logic 64 connects the OSPF task 60-O to context area CTXT 134. The OSPF task 60-O performs operations in accordance with the received packet, which may include updating the routing table and initiating the transmission of one or more routing protocol packets to other routers in the VPRN. Once the processing associated with the received routing protocol packet is complete, the context selection logic 64 is free to break the connection between the OSPF task 60 and context area CTXT 134 in favor of a new connection, which will generally involve a different context area CTXT of the memory 62 and may involve a different task 60 as well.

In the illustrated embodiment, the context selection logic 64 employs an inner-LSP label appearing in encapsulated protocol packets to identify which context area 62 to select for processing the packet. A mapping table (not shown) within the context selection logic 64 maps the label to a base address of the associated context area 62. The inner-LSP label appearing in the encapsulated protocol packets is likewise mapped to the generic interface identifiers used in the routing table that resides in the selected context area 62.

The number of tasks 60 can vary in accordance with the routing protocols being used by the active VPRNs and the processing resources available in the router 14. There must be at least one active task 60 for each different routing protocol used by any of the VPRNs supported by the router 14. Thus, if all of the active VPRNs are using either OSPF or BGP routing, for example, then the minimum set of tasks 60 is one OSPF task 60-O and one BGP task 60-B. In general, one task 60 can support a number of VPRNs of the same type (i.e., using the same routing protocol), depending on the processing resources allocated to the task 60 and the demand from the VPRNs. If there are a large number of active VPRNs using a given protocol, it may be desirable that there be multiple tasks 60 of the same type. These tasks may time-share the same physical processor(s), or may be distributed in a parallel fashion among different processors if such hardware processing resources are available in the router 14.

Similarly, the memory 62 may be a single memory containing all the context areas CTXT for all VRs of the router 14, or it may be a system having multiple independent memories, each containing some subset of the context areas CTXT. The context selection logic 64 is generally designed to exploit parallelism in order to maximize performance. If the hardware platform is capable of running multiple tasks 60 simultaneously and accessing multiple context areas CTXT of the memory 62 simultaneously, then preferably the context selection logic 64 looks for opportunities to activate two or more VRs simultaneously.

The connections 66 shown in FIG. 5 represent logical connections between each VR and the VI subsystem 52 of FIG. 4. In general, there are multiple such logical connections between each VR and the VI subsystem 52, with each logical connection corresponding to a different interface identifier. Some VRs may have as few as two associated VIs, whereas other VRs may have many.

It will be apparent to those skilled in the art that modifications to and variations of the above-described techniques are possible without departing from the inventive concepts disclosed herein. Accordingly, the invention should be viewed as limited solely by the scope and spirit of the appended claims.

What is claimed is:

1. A virtual routing system, comprising:
   a memory divided into a configurable number of context areas for a corresponding set of virtual private routed networks (VPRNs), each context area including a routing table and associated routing protocol state information for the corresponding VPRN, each VPRN employing a respective routing protocol and network address space;
   a set of one or more routing tasks, the set including at least one routing task for each different type of routing protocol employed in the set of VPRNs, each routing task being operable only with a separate routing table and with separate routing protocol state information to realize a corresponding virtual router to carry out associated routing operations in a VPRN; and
   context selection logic operative to selectively couple the routing tasks to the different context areas of the memory to realize a set of virtual routers, each virtual router being associated with a corresponding one of the VPRNs.

2. A virtual routing system according to claim 1, wherein the set of routing tasks includes at least one Open Shortest Path First (OSPF) routing task and at least one Border Gateway Protocol (BGP) routing task.

3. A virtual routing system according to claim 1, further comprising a set of virtual interfaces operative to translate between generic interface identifiers used by the virtual routers and physical interface information for physical network links to which the virtual routing system is connected.

4. A virtual routing system according to claim 3, wherein the physical network links to which the virtual routing system is connected employ label switched paths, and wherein the set of virtual interfaces include virtual interfaces containing information for encapsulating and attaching labels to packets on the label switched paths.

5. A virtual routing system according to claim 1, wherein the selective coupling of the routing tasks to the different context areas of the memory is performed at the rate at which protocol packets for the various VPRNs are received by the virtual routing system.

6. A method of operating a routing system, comprising:
maintaining a number of context areas in a memory for a corresponding set of virtual private routed networks (VPRNs) each context area including a routing table and associated routing protocol state information for the corresponding VPRN, each VPRN employing a respective routing protocol and network address space;
executing a set of one or more routing tasks, the set including at least one routing task for each different type of routing protocol employed in the set of VPRNs, each routing task being operable only with a separate routing table and with separate routing protocol state information to realize a corresponding virtual router to carry out associated routing operations in a VPRN; and
selectively coupling the routing tasks to the different context areas of the memory to realize a set of virtual routers, each virtual router being associated with a corresponding one of the VPRNs.

7. A method according to claim 6, wherein the set of routing tasks includes at least one Open Shortest Path First (OSPF) routing task and at least one Border Gateway Protocol (BGP) routing task.

8. A method according to claim 6, further comprising maintaining a set. of virtual interfaces operative to translate between generic interface identifiers used by the virtual routers and physical interface information for physical network links to which the virtual routing system is connected.

9. A method according to claim 8, wherein the physical network links to which the virtual routing system is connected employ label switched paths, and wherein the set of virtual interfaces include virtual interfaces containing information for encapsulating and attaching labels to packets on the label switched paths.

10. A method according to claim 6, wherein the selective coupling of the routing tasks to the different context areas of the memory is performed at the rate at which protocol packets for the various VPRNs are received by the virtual routing system.

* * * * *

UNITED STATES PATENT AND TRADEMARK OFFICE
CERTIFICATE OF CORRECTION

| | | |
|---|---|---|
| PATENT NO. | : 7,039,720 B2 | Page 1 of 1 |
| APPLICATION NO. | : 10/000191 | |
| DATED | : May 2, 2006 | |
| INVENTOR(S) | : Alfieri et al. | |

It is certified that error appears in the above-identified patent and that said Letters Patent is hereby corrected as shown below:

In Column 8, Line 15, in Claim 8, delete "set." and insert -- set --, therefor.

Signed and Sealed this

Twenty-ninth Day of December, 2009

David J. Kappos
*Director of the United States Patent and Trademark Office*